(12) United States Patent
Zhang et al.

(10) Patent No.: US 10,347,898 B2
(45) Date of Patent: Jul. 9, 2019

(54) OVERCHARGE PROTECTION DEVICE FOR A BATTERY MODULE

(71) Applicant: Johnson Controls Technology Company, Auburn Hills, MI (US)

(72) Inventors: Xugang Zhang, Milwaukee, WI (US); Jonathan P. Lobert, Hartford, WI (US); Jason D. Fuhr, Sussex, WI (US); David R. Boone, Waukesha, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 15/908,600

(22) Filed: Feb. 28, 2018

(65) Prior Publication Data

US 2018/0190968 A1 Jul. 5, 2018

Related U.S. Application Data

(62) Division of application No. 14/749,417, filed on Jun. 24, 2015, now Pat. No. 9,985,271.

(Continued)

(51) Int. Cl.
*H01M 2/34* (2006.01)
*H01M 2/12* (2006.01)

(52) U.S. Cl.
CPC ............ *H01M 2/345* (2013.01); *H01M 2/12* (2013.01); *H01M 2/1229* (2013.01);
(Continued)

(58) Field of Classification Search
CPC .. H01M 2/345; H01M 2/1276; H01M 2/1229; H01M 2/12; H01M 2220/20; H01M 2200/20
See application file for complete search history.

(56) References Cited

U.S. PATENT DOCUMENTS 5,554,455 A 9/1996 Inoue et al.
5,741,606 A 4/1998 Mayer et al.
(Continued)

FOREIGN PATENT DOCUMENTS

EP 0638944 A1 2/1995
EP 0773595 B1 1/2000
(Continued)

OTHER PUBLICATIONS

EP 18198024.4 Search Report dated Feb. 26, 2019.

*Primary Examiner* — Michael L Dignan
(74) *Attorney, Agent, or Firm* — Fletcher Yoder, P.C.

(57) ABSTRACT

The present disclosure includes a battery module having a plurality of battery cells disposed in a housing. Each of the plurality of battery cells has a positive terminal, a negative terminal, an overcharge protection assembly, and a casing having an electrically conductive material. The overcharge protection assembly includes a vent, a first spring component, a second spring component, and an insulative component. The first spring component is coupled to the positive terminal, the second spring component is coupled to the negative terminal, the insulative component is between the first spring component and a conductive piece and between the second spring component and the conductive piece, and the vent is configured to drive the insulative component from between the first and second spring components and the conductive piece, such that the first and second spring components contact the conductive piece, when a pressure in the casing exceeds a threshold.

19 Claims, 11 Drawing Sheets

Related U.S. Application Data

(60) Provisional application No. 62/031,729, filed on Jul. 31, 2014.

(52) U.S. Cl.
CPC ...... *H01M 2/1276* (2013.01); *H01M 2200/20* (2013.01); *H01M 2220/20* (2013.01)

(56) References Cited

U.S. PATENT DOCUMENTS

| | | | |
|---|---|---|---|
| 5,766,790 A | 6/1998 | Kameishi et al. | |
| 5,914,201 A | 6/1999 | Hughett et al. | |
| 6,210,824 B1 | 4/2001 | Sullivan et al. | |
| 6,342,826 B1 * | 1/2002 | Quinn | H01H 35/343 337/13 |
| 7,067,212 B2 | 6/2006 | Willimowski et al. | |
| 7,192,665 B2 | 3/2007 | Nakajima et al. | |
| 7,763,375 B2 | 7/2010 | Igoris et al. | |
| 7,799,479 B2 | 9/2010 | Andreas-Schott et al. | |
| 8,057,933 B2 | 11/2011 | Miyahisa et al. | |
| 8,435,660 B2 | 5/2013 | Kim et al. | |
| 8,512,887 B2 | 8/2013 | Reyburn et al. | |
| 8,597,849 B2 | 12/2013 | Junge et al. | |
| 8,709,626 B2 | 4/2014 | Lim | |
| 2008/0038627 A1 | 2/2008 | Yamauchi et al. | |
| 2010/0266879 A1 * | 10/2010 | Byun | H01M 2/1235 429/53 |
| 2010/0279156 A1 * | 11/2010 | Kim | H01M 2/0404 429/56 |
| 2011/0039136 A1 * | 2/2011 | Byun | H01M 2/0404 429/56 |
| 2011/0052949 A1 * | 3/2011 | Byun | H01M 2/043 429/61 |
| 2011/0177387 A1 * | 7/2011 | Byun | H01M 2/04 429/178 |
| 2012/0189884 A1 * | 7/2012 | Guen | H01M 2/0473 429/82 |
| 2013/0115511 A1 * | 5/2013 | Han | H01M 2/1241 429/208 |
| 2014/0162092 A1 | 6/2014 | Reitzle et al. | |
| 2014/0170449 A1 | 6/2014 | Takahashi et al. | |
| 2014/0272492 A1 | 9/2014 | Lange et al. | |
| 2014/0302359 A1 | 10/2014 | Huang et al. | |

FOREIGN PATENT DOCUMENTS

| | | |
|---|---|---|
| EP | 2259364 B1 | 4/2013 |
| JP | 2004303447 A | 10/2004 |
| JP | 2005216775 A | 8/2005 |

* cited by examiner

OVERCHARGE PROTECTION DEVICE FOR A BATTERY MODULE

CROSS REFERENCE TO RELATED APPLICATIONS

This application is a divisional of U.S. patent application Ser. No. 14/749,417, entitled "OVERCHARGE PROTECTION DEVICE FOR A BATTERY MODULE," filed Jun. 24, 2015, which claims priority to and the benefit of U.S. Provisional Application Ser. No. 62/031,729, entitled "EXTERNAL SHORT DEVICE FOR OVERCHARGE PROTECTION" filed Jul. 31, 2014, which are hereby incorporated by reference.

BACKGROUND

The present disclosure relates generally to the field of batteries and battery modules. More specifically, the present disclosure relates to features of a battery cell that may protect a battery module from thermal runaway during an overcharge event.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives, or contributes to drive, the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, battery modules may undergo overcharge testing to determine boundaries and/or limits of the battery module and its individual battery cells. However, in certain instances, overcharging the battery module may lead to thermal runaway (e.g., an internal short circuit) caused by overheating or over pressurization of the battery cells. Thermal runaway may render the battery module permanently inoperable, and therefore, devices that may prevent or block thermal runaway are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module having a housing and a plurality of battery cells disposed in the housing. Each of the plurality of battery cells has a positive terminal, a negative terminal, an overcharge protection assembly, and a casing having an electrically conductive material. The overcharge protection assembly includes a vent, a first spring component, a second spring component, and an insulative component. The first spring component is electrically coupled to the positive terminal, the second spring component is electrically coupled to the negative terminal, the insulative component is disposed between the first spring component and the casing and between the second spring component and the casing, and the vent is configured to drive the insulative component from between the first and second spring components and the casing, such that the first and second spring components electrically contact the casing, when a pressure in the casing exceeds a threshold value.

The present disclosure also relates to a battery module that includes a plurality of battery cells disposed in a housing of the battery module. Each of the plurality of battery cells has a positive terminal, a negative terminal, an overcharge protection assembly, and a casing. The overcharge protection assembly includes a vent, a first conductive component, a second conductive component, and a conductive bistable arc, the first conductive component is electrically coupled to the positive terminal, the second conductive component is electrically coupled to the negative terminal, and the vent is configured to drive the conductive bistable arc into contact with both the first and second conductive components when a pressure in the casing exceeds a threshold value.

The present disclosure also relates to a lithium-ion battery cell that includes a positive terminal, a negative terminal, a casing having an electrically conductive material, and an overcharge protection assembly that includes a vent flap, a first conductive component, a second conductive component, and an insulating component. The vent flap has an open position and a closed position, the first conductive component is electrically coupled to the positive terminal, the second conductive component is electrically coupled to the negative terminal, the insulating component is positioned between the first conductive component and the casing and between the second conductive component and the casing when the vent flap is in the closed position, and the vent flap is configured to drive the insulating component from between the first conductive component and the casing and from between the second conductive component and the casing when the vent flap moves from the closed position to the open position, and the first and second conductive components contact the casing when the vent flap is in the open position.

DRAWINGS

Various aspects of this disclosure may be better understood upon reading the following detailed description and upon reference to the drawings in which.

DETAILED DESCRIPTION

Figure 1:
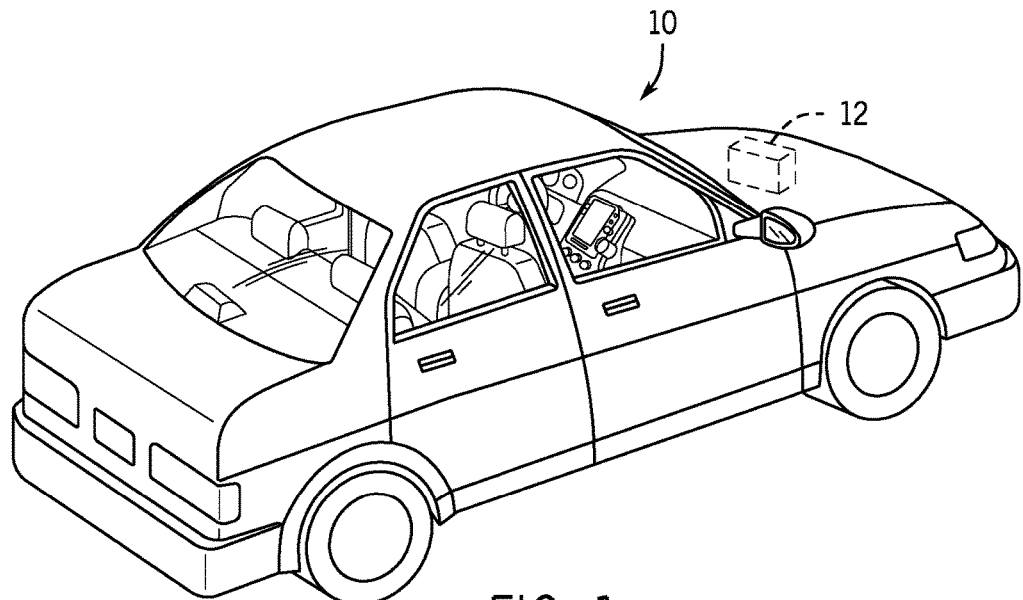
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., Lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

During the design and manufacturing process of a battery module, various tests may be performed upon the battery module and its individual battery cells to determine optimal performance parameters. For example, overcharge tests may provide excess electrical current to an individual battery cell of a battery module using a power supply with a voltage that exceeds a voltage of the individual battery cell. Overcharge testing may provide data related to temperature, heat output, and/or voltage of the overcharged battery cell, which may enable designers or manufacturers to modify various components of the battery cell to enhance performance (e.g., minimize damage to an overcharged battery cell). Therefore, such tests may be desirable for providing information that may enable manufacturers to optimize a battery module.

However, in certain cases, overcharging a battery cell may lead to thermal runaway (e.g., an internal short circuit) or another event that can permanently damage the battery cell. For instance, charging a battery cell may generate dendrites as a result of intercalation of positive ions in the anode. During an overcharge test, thermal runaway may result due to an excess buildup of dendrites on a separator of a battery cell (e.g., the dendrites may penetrate the separator enabling mixing of the positive electrode and the negative electrode). Thermal runaway may be undesirable because it generates excessive heat and pressure, which may cause permanent damage to the battery cell and/or render the battery cell permanently inoperable.

It is now recognized that various features may be included in the battery cell that prevent or block thermal runaway while performing overcharge tests. Some traditional battery cells may include a mechanism that disrupts a flow of electrical current to at least one terminal of the battery cell when a pressure in the battery cell reaches a certain level. However, such mechanisms may ultimately lead to decreased current capacity of the battery cell. Therefore, it is now recognized that it may be desirable to maintain the electrical connection to one or both terminals of the battery cell while preventing thermal runaway during overcharge. In accordance with aspects of the present disclosure, when a pressure in the battery cell exceeds a threshold level, an external short circuit may be triggered by electrically coupling the positive terminal and the negative terminal of the battery cell via a casing of the battery cell, for example. Accordingly, thermal runaway may be prevented and an electrical current capacity of the battery cell terminals is not reduced because the electrical pathway (e.g., connection) from an external load to the terminals remains intact. Other embodiments of the present disclosure include an overcharge protection assembly that may trigger an external short circuit on a battery cell that includes an electrically insulative casing.

Certain embodiments of the present disclosure relate to an overcharge protection assembly for battery modules having battery cells with neutral cans. As used herein a "neutral can" may be defined as a battery cell casing that is not electrically coupled to either the positive terminal or the negative terminal of the individual battery cell. Conversely, a "polarized can" may be defined as a battery cell casing which is electrically coupled to the positive terminal or the negative terminal (e.g., the positive terminal or the negative terminal contacts the battery cell casing) of the battery cell.

FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
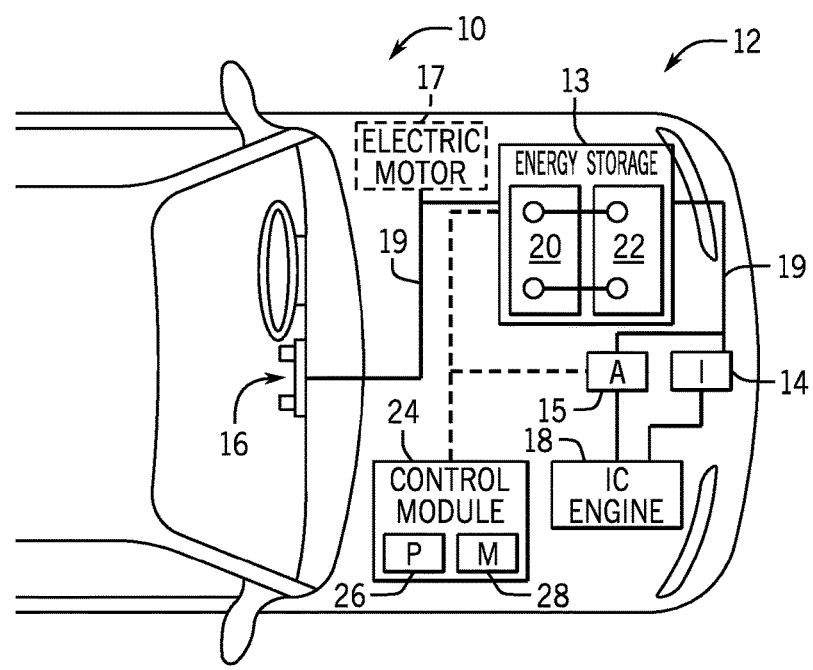
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processors 26 and one or more memory components 28. More specifically, the one or more processors 26 may include one or more application specific integrated circuits (ASICs), one or more field programmable gate arrays (FPGAs), one or more general purpose processors, or any combination thereof. Additionally, the one or more memory components 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

As discussed above, before a battery module may be used to supply power to an xEV, various tests may be conducted upon the battery module and its individual battery cells to optimize operating parameters of the battery module. One such test may be an overcharge test that determines how much electrical current a battery cell may receive, or how long a battery cell may receive an electrical current, before damage occurs to the battery cell. However, in certain instances, overcharge tests may result in thermal runaway (e.g., an internal short circuit within the battery cell), which may cause permanent damage to the battery cell because of excess heat and pressure generated from the overcharge. It is now recognized that it may be desirable to prevent thermal runaway (e.g., an internal short circuit) by triggering an external short circuit (e.g., electrically coupling the positive terminal and the negative terminal of the battery cell) before thermal runaway occurs. In certain embodiments, the external short circuit may be triggered by establishing an electrical connection between a positive terminal of a battery cell and a casing of the battery cell as well as between a negative terminal of the battery cell and the casing (e.g., can). In some embodiments, a conductive component (e.g., a conductive piece), other than the battery cell casing, may be utilized to establish the electrical connection. Accordingly, an electrical connection may be established between the positive cell and the negative cell, thereby triggering a short circuit.

Figure 3:
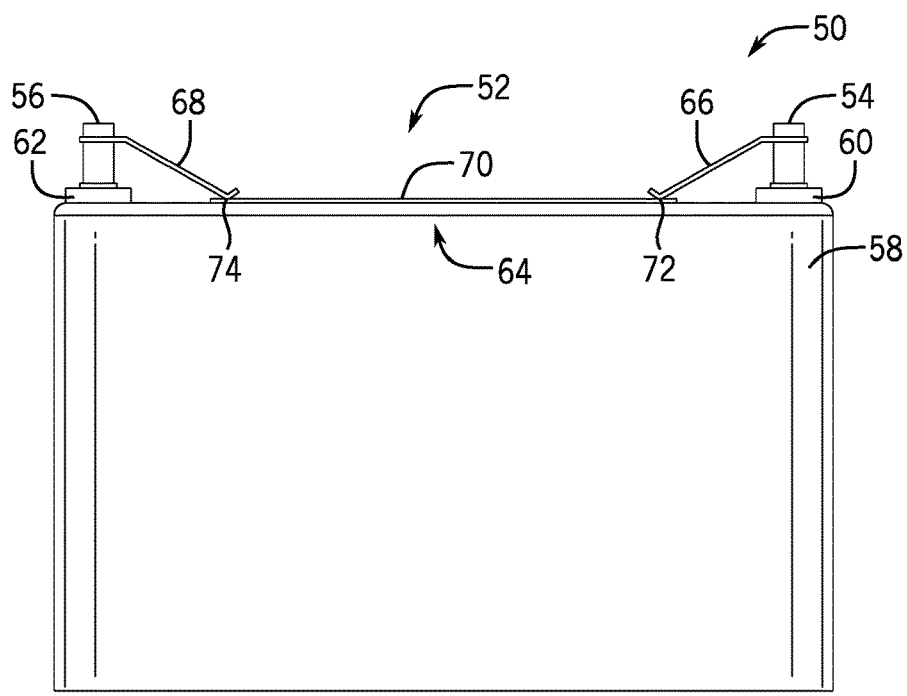
FIG. 3 is a side view of a battery cell that includes an overcharge protection assembly to prevent thermal runaway during an overcharge test, in accordance with an aspect of the present disclosure.

FIG. 3 is a side view of a battery cell 50 that may include an overcharge protection assembly 52 to prevent thermal runaway during overcharge tests. The battery cell 50 may be used in the lithium-ion battery module 20 that supplies power to an xEV. It should be noted that while the current discussion focuses on an overcharge protection assembly in a lithium-ion battery cell 50, embodiments of the overcharge protection assembly may be employed in any suitable battery cell that undergoes overcharge tests.

As shown in the illustrated embodiment of FIG. 3, the battery cell 50 includes a positive terminal 54 and a negative terminal 56. The battery cell 50 illustrated in FIG. 3 includes a neutral can (e.g., casing) because both the positive terminal 54 and the negative terminal 56 are electrically insulated from a casing 58 of the battery cell 50 (e.g., the casing 58 includes an electrically conductive material). In some embodiments, the casing 58 may be used to establish an electrical connection between the positive terminal 54 and the negative terminal 56, or a conductive piece attached to the battery cell 50 may be used instead of the casing 58 to form the electrical connection. In certain embodiments, the positive terminal 54 may include a first insulative gasket 60 configured to prevent electrical current from flowing from the positive terminal 54 to the casing 58, or vice versa. Similarly, the negative terminal 56 may include a second insulative gasket 62 that prevents electrical current from flowing from the negative terminal 56 to the casing 58, or vice versa. In some embodiments, a portion of the casing 58 is non-conductive and prevents electrical current from flowing from the positive and negative terminals 54, 56 or to conductive parts of the casing 58. According, a conductive piece may be used to trigger the external short circuit and to establish the electrical connection between the positive and negative terminals 54, 56.

Additionally, the illustrated embodiment of FIG. 3 shows the overcharge protection assembly 52 having a vent flap 64, a first conductive spring 66, a second conductive spring 68, and an insulative component 70. The first conductive spring 66 may be electrically coupled to the positive terminal 54 and the second conductive spring 68 may be electrically coupled to the negative terminal 56. In certain embodiments, the first and second conductive springs 66, 68 may be disposed over the positive and/or negative terminals 54, 56 via a hole or opening in the first and second conductive springs 66, 68 that is configured to receive the positive and/or negative terminals 54, 56. Further, the first and second conductive springs 66, 68 may be electrically coupled to the positive and/or negative terminals 54, 56 via a weld (e.g., a laser weld). In other embodiments, the first and second conductive springs 66, 68 may be electrically coupled to the positive and/or negative terminals 54, 56 via a fastener (e.g., screw or bolt). In still further embodiments, the first and second conductive springs 66, 68 may be electrically coupled to the positive and/or negative terminals 54, 56 using any suitable technique for establishing an electrical connection between the positive and/or negative terminals 54, 56 and the first and second conductive springs 66, 68.

Additionally, the first and second conductive springs 66, 68 may include a conductive metal (e.g., aluminum or copper) such that an electrical connection may be established between the first conductive spring 66 and the casing 58 and/or between the second conductive spring 68 and the casing 58. The first and second conductive springs 66, 68 may be shaped in such a manner as to bias the first and second conductive springs 66, 68 towards the casing 58. For example, when the first conductive spring 66 is coupled to the positive terminal 54, a first recessed portion 72 of the first conductive spring 66 may be driven towards the casing 58. When the first recessed portion 72 contacts the casing 58, an electrical connection may be established between the positive terminal 54 and the casing 58. Similarly, when the second conductive spring 68 is coupled to the negative terminal 56, a second recessed portion 74 of the second conductive spring 68 may be driven towards the casing 58. When the second recessed portion 74 contacts the casing 58, an electrical connection may be established between the negative terminal 56 and the casing 58. When both the first and second recessed portions 72, 74 contact the casing 58, an electrical connection may be established between the positive terminal 54 and the negative terminal 56 via the casing 58, which may trigger a short circuit.

However, it may be undesirable to trigger such a short circuit during normal operation of the battery cell 50 (e.g., when the battery cell 50 is not overcharged). Therefore, when a pressure in the casing 58 of the battery cell 50 is below the threshold value, it may be desirable to prevent formation of the electrical connection between the positive terminal 54 and the negative terminal 56. Accordingly, to avoid establishing such an electrical connection during normal operation of the battery cell 50 (e.g., when the pressure in the casing 58 is below the threshold value), the insulative component 70 may be disposed between the first recessed portion 72 of the first conductive spring 66 and the casing 58. Similarly, the insulative component may be disposed between the second recessed portion 74 of the second conductive spring 68 and the casing 58. In other embodiments, the insulative component 70 may be disposed between first recessed portion 72 or the second recessed portion 74 and the casing 58. In still further embodiments, a second insulative component may be utilized such that the insulative component 70 is disposed between the first recessed portion 72 and the casing 58, and the second insulative component may be disposed between the second recessed portion 74 and the casing 58.

In certain embodiments, the insulative component 70 and/or the second insulative component may include any material (e.g., plastic, ceramic, rubber, or another non-conductive material) that may be configured to prevent electrical current from flowing through the insulative component 70 and/or the second insulative component. Therefore, during normal operation of the battery cell 50, the insulative component 70 and/or the second insulative component may block formation of the electrical connection between the positive terminal 54 and the negative terminal 56 (e.g., via the first and/or second conductive springs 66, 68 and the casing 58).

To produce electrical power in the battery cell 50, one or more chemical reactions may take place. In some cases, such reactions form a gas (e.g., electrolyte) as a byproduct, and thus, the pressure within the casing 58 increases as more gas is produced. As a battery is overcharged, a temperature within the casing 58 may increase (e.g., from an excess of electric current), which in turn, may further increase the pressure in the casing 58. In certain embodiments, the vent flap 64 may be calibrated to open (e.g., from a pressure force within the casing 58) when the pressure within the casing 58 reaches a threshold value (e.g., a predetermined pressure value lower than a pressure known to indicate thermal runaway). When the vent flap 64 opens, gas within the casing 58 may escape (e.g., flow out of) into a housing of the battery module 20.

Figure 4:
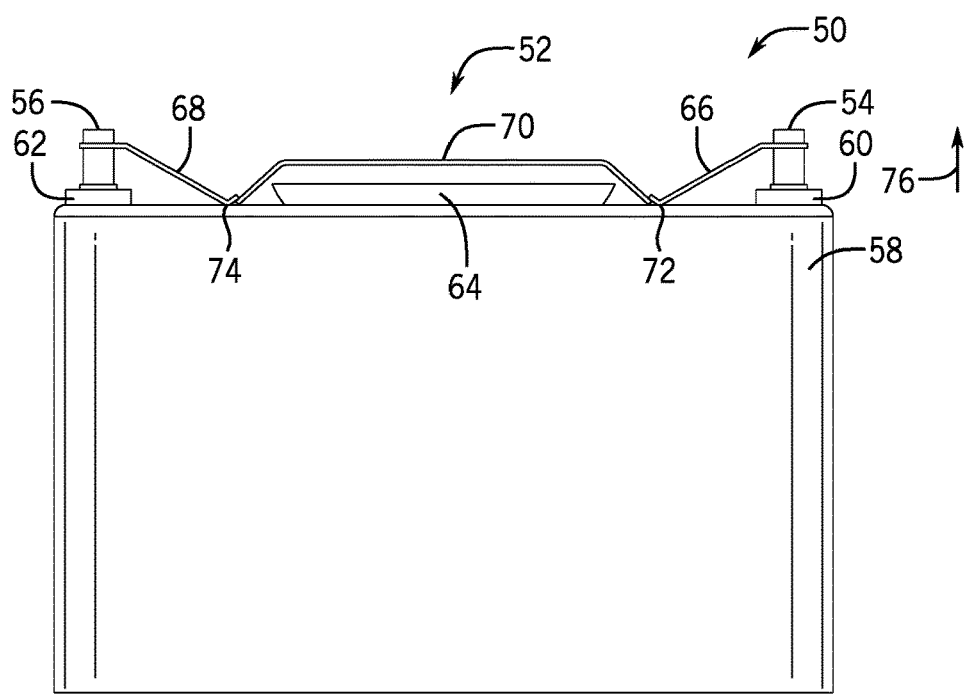
FIG. 4 illustrates a side view of the battery cell of FIG. 3 when a vent flap is in an open position, in accordance with an aspect of the present disclosure.

FIG. 4 illustrates a side view of the battery cell 50 when the vent flap 64 is in an open position as a result of the pressure in the casing 58 reaching the threshold value. When the pressure in the casing 58 reaches the threshold value, the vent flap 64 may be configured to open as shown in FIG. 4. Accordingly, the vent flap 64 may be biased towards a closed position (e.g., the position illustrated in FIG. 3), but when the pressure in the casing 58 reaches the threshold value, the pressure force may be sufficient to overcome the bias and urge the vent flap 64 to the open position (e.g., the position shown in FIG. 4).

In certain embodiments, the vent flap 64 may include a dual-door configuration such that the vent flap 64 opens down a crease (e.g., seam) in a center of the vent flap 64 (e.g., as if the vent flap 64 is connected to the casing 58 via two hinges, one for each door). For example, the vent flap 64 may include an indented crease (e.g., punctures in the vent flap that do not enable gas to pass out of the casing 58) located in the center of the vent flap 64. Accordingly, when the pressure in the casing 58 reaches the threshold value, the indented crease may break (e.g., rupture) and enable two doors of the vent flap 64 to open in a direction 76 to drive the insulative component 70 from between the first and/or second conductive springs 66, 68 and the casing 58. The crease may be thinner than other parts of the casing 58 and hinges on either side of the crease may also be thinner than the casing 58, but not as thin as the crease. In other embodiments, the vent flap 64 may be configured to open as if connected to the casing 58 via a single hinge (e.g., the vent flap 64 includes a single door). For example, the vent flap 64 may include a perimeter that includes an indented portion. Accordingly, when the pressure in the casing 58 reaches the threshold value, the indented portion may break (e.g., rupture) such that the entire vent flap 64 moves in the direction 76 to drive the insulative component 70 from beneath the first and/or second conductive springs 66, 68. In still further embodiments, the vent flap 64 may be configured to open in any suitable manner that may move the insulative component 70 from between the first conductive spring 66 and the casing 58 as well as from between the second conductive spring 68 and the casing 58. In any event, when the vent flap 64 opens, the first and second conductive springs 66, 68 may be configured to contact the casing 58 and establish an electrical connection between the positive terminal 54 and the negative terminal 56 via the casing 58.

Accordingly, when the pressure in the casing 58 reaches the threshold value, the vent flap 64 may move to the open position (e.g., in the direction 76) and move the insulative component 70 such that it no longer is positioned between the first and second conductive springs 66, 68 and the casing 58. When the insulative portion 70 is moved by the vent shield 64, the first and second conductive springs 66, 68 may contact the casing 58 and establish an electrical connection between the positive terminal 54 and the negative terminal 56, via the casing 58. The electrical connection may then cause a short circuit, which may lead to a discharge of electrical current from the cell 50. Additionally, the short circuit may form an alternative path for charge current received from a power supply because a resistance of the short circuit may be substantially smaller than an internal resistance of the cell 50. Such an external short circuit may avoid thermal runaway within the battery cell 50 when the battery cell 50 is overcharged (e.g., during an overcharge test). The external short circuit may be triggered via contact between the casing and the insulated positive and negative terminals 54, 56. However, an electrical connection between the positive and/or negative terminal 54, 56 and an external load (e.g., another battery) is not disrupted (e.g., by breaking a connection between the terminal 54, 56 and the external load) by the external short circuit. Rather, electrical connections between the positive and/or negative terminals 54, 56 are maintained (e.g., a current capacity of the battery cell 50 is not substantially affected), while the external short circuit serves to discharge the battery cell 50 and avoid thermal runaway.

In certain embodiments, more than one battery cell may be included in the battery module 20. The power supplied by the battery module 20 may be generated from each of the individual battery cells 50 included in the battery module 20. Therefore, the battery cells 50 may be coupled to one another such that the power supplied by the battery module 20 is cumulative of a power associated with each of the individual battery cells 50. Accordingly, it may be desirable to incorporate conductive springs into a bus bar that interconnects battery cells 50 in the battery module 20 to simplify assembly and manufacturing of the battery module 20.

Figure 5:
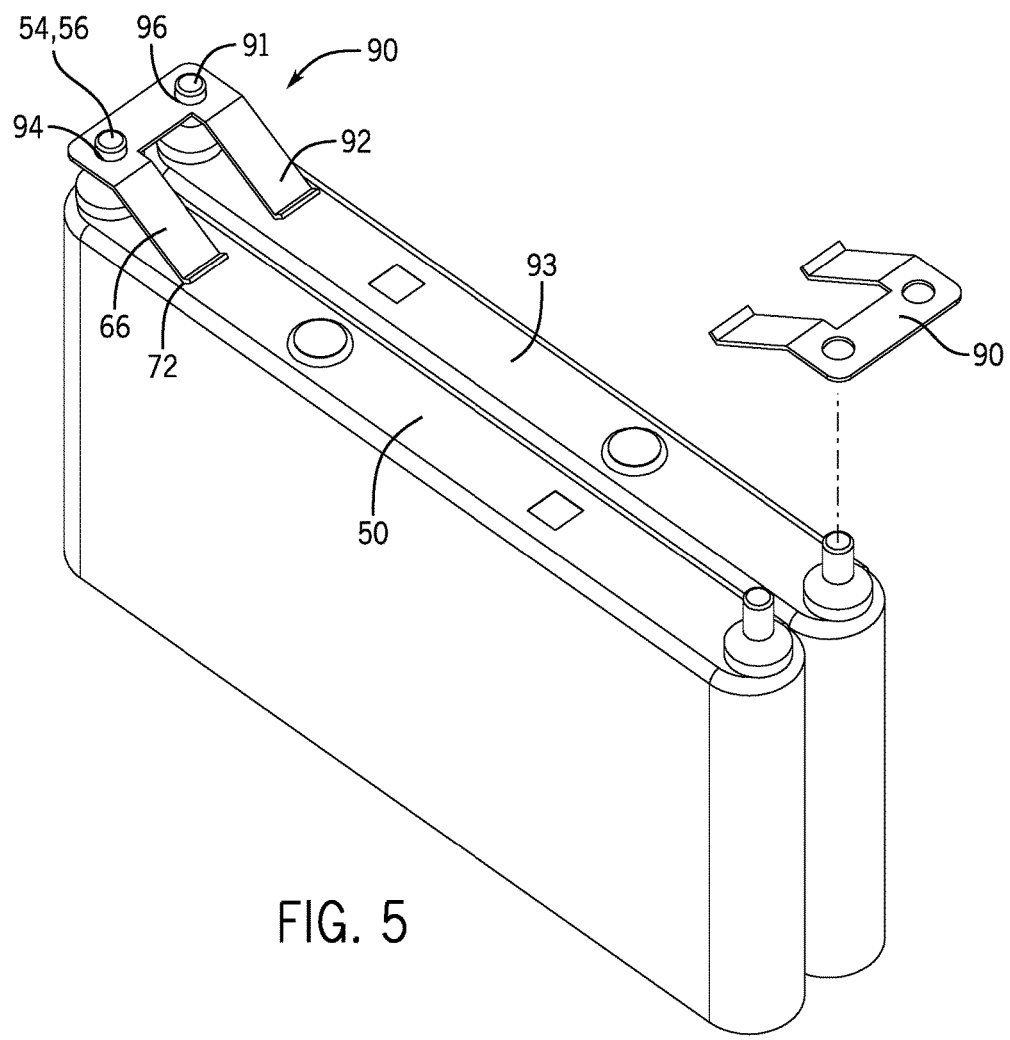
FIG. 5 illustrates an embodiment of a bus bar that includes two conductive springs of the overcharge protection assembly of FIG. 3 incorporated into a single piece, in accordance with an aspect of the present disclosure.

FIG. 5 illustrates an embodiment of a bus bar 90 that includes the first conductive spring 66 and a third conductive spring 92 incorporated into a single piece (e.g., the bus bar 90). In certain embodiments, the third conductive spring 92 may be disposed on a terminal 91 (e.g., a positive terminal or a negative terminal) of a second battery cell 93 positioned adjacent to the battery cell 50. For example, the first conductive spring 66 may be coupled to the positive terminal 54 of the battery cell 50. Additionally, the third conductive spring 92 may be coupled to the terminal 91 of the second battery cell 93. When the terminal 91 is a positive terminal, the battery cell 50 may be coupled to the second battery cell 93 in a parallel configuration via the bus bar 90. Connecting two battery cells 50, 93 in a parallel configuration may be desirable because a parallel connection enables the battery module 20 to have a voltage output equal to the sum of the individual battery cells 50 connected in parallel. Conversely, when the terminal 91 is a negative terminal of the second battery cell 93, the battery cell may be coupled to the second battery cell 93 in a series configuration via the bus bar 90.

The first conductive spring 66 may be electrically coupled to the positive terminal 54 or the negative terminal 56 of the battery cell 50. Similarly, the third conductive spring 92 may be electrically coupled to the terminal 91 of the second battery cell 93, which may be either positive or negative. In certain embodiments, the first conductive spring 66 may be disposed over a respective terminal 54, 56 via a first opening 94 (e.g., a hole aligned with the respective terminal 54, 56) of the bus bar 90 configured to receive the positive and/or negative terminals 54, 56. Similarly, the third conductive spring 92 may be disposed over the terminal 91 via a second opening 96 (e.g., a hole aligned with the terminal 91) of the bus bar 90 configured to receive the terminal 91 of the second battery cell 93. Further, the first and/or third conductive springs 66, 92 of the bus bar 90 may be electrically coupled to respective terminals 54, 56, and/or 91 via a weld (e.g., a laser weld). In other embodiments, the first and third conductive springs 66, 92 of the bus bar 90 may be electrically coupled to the respective terminals 54, 56, and/or 91 via a fastener (e.g., screw or bolt). In still further embodiments, the first and third conductive springs 66, 92 of the bus bar 90 may be secured to the respective terminals 54, 56, and/or 91 using any suitable technique for establishing an electrical connection between the respective terminals 54, 56, and/or 91 and the first and third conductive springs 66, 92.

Figure 6:
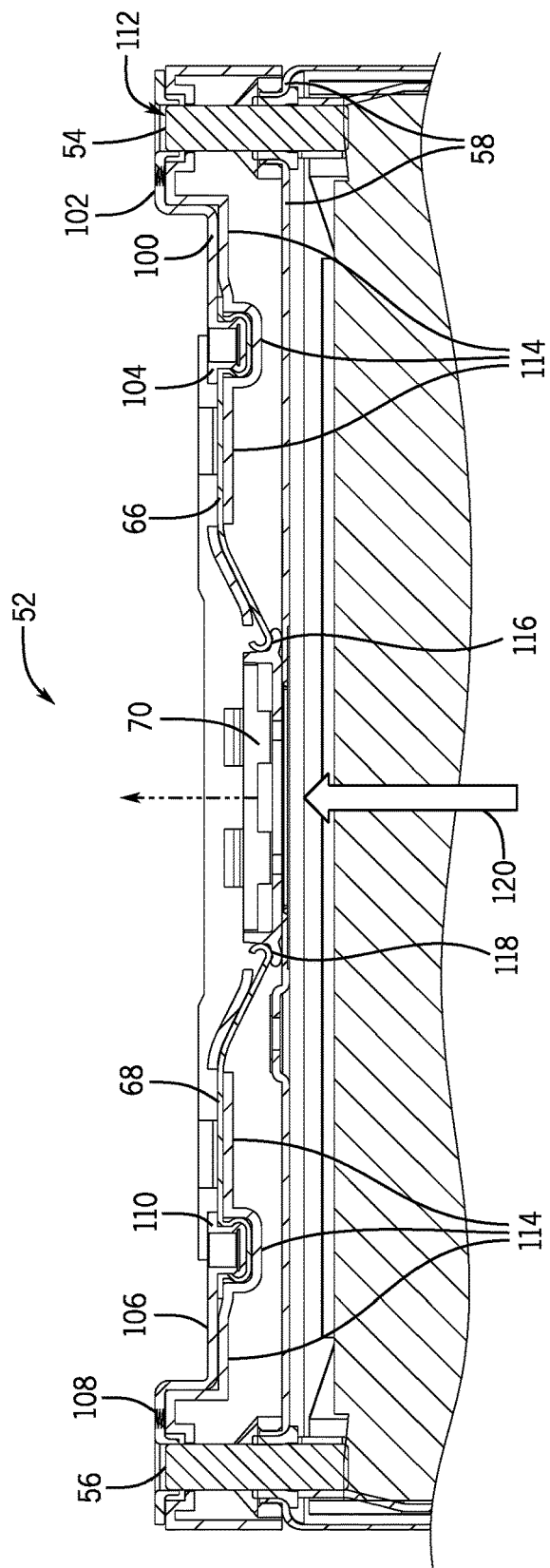
FIG. 6 illustrates another embodiment of an overcharge protection assembly, in accordance with an aspect of the present disclosure.

FIG. 6 illustrates another embodiment of the overcharge protection assembly 52. As shown in the illustrated embodiment of FIG. 6 the first and second conductive springs 66, 68 may not be directly coupled to the positive terminal 54 and the negative terminal 56, respectively. Rather, intermediate components (e.g., terminal pads) may be directly coupled to the terminals 54, 56, as well as to the first and second conductive springs 66, 68. Therefore, a first terminal pad 100 may be coupled to the positive terminal 54 at a first end 102 of the first terminal pad 100 and to the first conductive spring 66 at a second end 104 of the first terminal pad 100. Similarly, a second terminal pad 106 may be coupled to the negative terminal 56 at a first end 108 of the second terminal pad 106 and to the second conductive spring 68 at a second end 110 of the second terminal pad 106. In certain embodiments, the terminal pads 100, 106 may include "Z"-shaped cross-sections. Accordingly, the terminal pads 100, 106 may be configured to couple two components that are positioned on different planes (e.g., two components with different heights). For example, the positive terminal has an end 112 that lies on a different plane than the first conductive spring 66 when it contacts the casing 58. Therefore, the "Z" shape of the terminal pads 100, 106 may enable such components to be electrically coupled to one another.

As shown in the illustrated embodiment of FIG. 6, the first terminal pad 100 is coupled to the first conductive spring 66 via a TOX® joint, which is a registered trademark of TOX® PRESSOTECHNIK L.L.C. Additionally, the second terminal pad 106 is coupled to the second conductive spring 68 via a TOX® joint. A TOX® joint may be a joint between two components that secures the two components together. Additionally, when the two components include a conductive material, an electrical connection may also be established between the two components via the TOX® joint. In other embodiments, the terminal pads 100, 106 may be coupled to the conductive springs 66, 68 via welding (e.g., laser welding) and/or a fastener (e.g., rivets, screws, bolts).

Additionally, the terminal pads 100, 106 may be coupled to the terminals 54, 56 via a weld (e.g., laser weld) such that the terminal pads 100, 106 are secured to the terminals 54, 56 and form an electrical connection between the terminal pads 100, 106 and the terminals 54, 56. In other embodiments, the terminal pads 100, 106 may be coupled to the terminals 54, 56 via fasteners (e.g., rivets, screws, or bolts), or any other suitable technique for securing and electrically coupling two components to one another.

In certain embodiments, the terminal pads 100, 106 and the conductive springs 66, 68 may further be secured to the battery cell 50 via various grooves 114 (e.g., fabricated recesses or slots) within a separate carrier device (e.g., a housing component coupled to the casing 58). As shown in the illustrated embodiment of FIG. 6, the terminal pads 100, 106 and the conductive springs 66, 68 may be substantially fixed within the grooves 114. The grooves 114 may prevent substantial movement of the terminal pads 100, 106 and/or the conductive springs 66, 68 due to movement of the battery module 20 caused by the xEV, for example. When the vent flap 64 opens, the insulative component 70 may be removed from between the first and second conductive springs 66, 68 and the casing 58 such that the first and second conductive springs 66, 68 will both contact the casing 58 and trigger a short circuit.

FIG. 6 also illustrates another embodiment of the insulative component 70. As shown, the insulative component 70 may include a first slot 116 configured to be positioned between the casing 58 and the first conductive spring 66 when the pressure within the casing 58 is below the threshold value (e.g., the vent flap 64 is closed). Similarly, the insulative component 70 may include a second slot 118 configured to be positioned between the casing 58 and the second conductive spring 68 when the pressure within the casing 58 is below the threshold value (e.g., the vent flap 64 is closed).

As discussed above, gas may be produced as a byproduct of the chemical reactions taking place within the casing 58. Such gas may build up during an overcharge test, thereby increasing the pressure in the casing. In certain embodiments, when the pressure reaches or exceeds a threshold value, the vent flap 64 may be configured to open. Moreover, the pressure force applied to the vent flap 64 by the gas in the casing 58 may further be utilized to remove the insulative component 70 from between the casing 58 and the first and second conductive springs 66, 68. For example, when the vent flap 64 opens, doors of the vent flap 64 may press against the insulative component 70 and drive the insulative component 70 in a direction 120. Accordingly, the first slot 116 may be removed from the position between the first conductive spring 66 and the casing 58 and the second slot 118 may be removed from the position between the second conductive spring 68 and the casing 58. Therefore, the first and second conductive springs 66, 68 may then contact the casing 58, which may establish an electrical connection between the positive terminal 54 and the negative terminal 56. Such an electrical connection may trigger an external short circuit, which may discharge the battery cell 50. It may be desirable to trigger the external short circuit before an internal short circuit (e.g., thermal runaway) occurs because the internal short circuit (e.g., thermal runaway) may cause permanent damage to the battery cell 50 and/or render the battery cell 50 inoperable.

Figure 7:
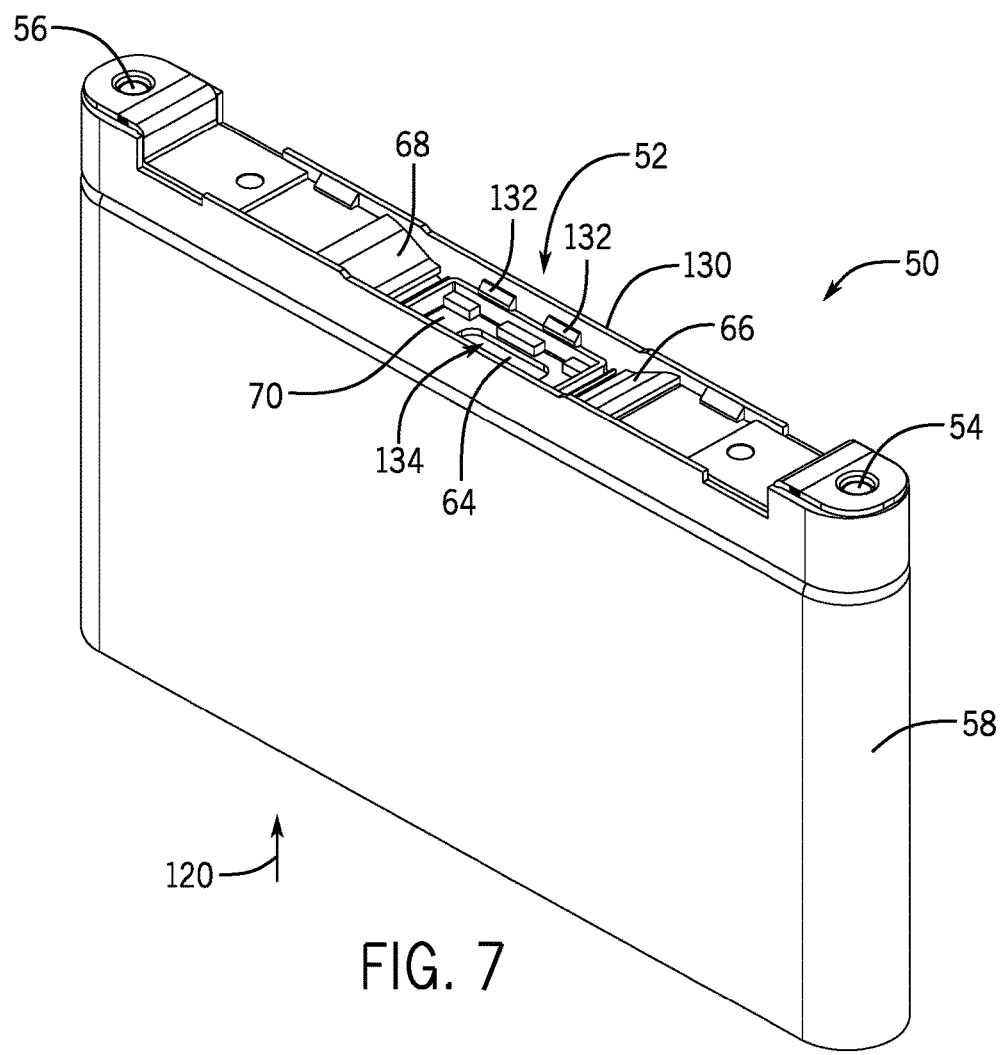
FIG. 7 illustrates a perspective view of the battery cell and the overcharge protection assembly of FIG. 6, in accordance with an aspect of the present disclosure.

FIG. 7 illustrates a perspective view of the battery cell 50 and the overcharge protection assembly 52 of FIG. 6. As can be seen in FIG. 7, a separate carrier 130 is attached to the battery cell 50. The separate carrier 130 may house the positive terminal 54, the negative terminal 56, the first conductive spring 66, the second conductive spring 68, the insulative component 70, as well as other components of the battery cell 50 that may be positioned proximate to the vent flap 64. In certain embodiments, the separate carrier 130 may include an insulative material (e.g., a material that prevents or blocks electrical current from flowing through it). For example, it may be desirable to utilize an insulative material to construct the separate carrier 130 to avoid inadvertent short circuits (e.g., the separate carrier may block metal particles from contacting the positive terminal 54 and/or the negative terminal 56). Additionally, when both the first and second conductive springs 66, 68 are housed within the separate carrier 130, a short circuit may be avoided even when the first and/or second conductive springs 66, 68 contact the separate carrier 130.

In certain embodiments the separate carrier 130 may include protrusions 132 that hold the insulative component 70 in place. For example, the battery cell 50 may be disposed within the battery module 20, which may be utilized to power an xEV. As the xEV moves, the xEV may subject the battery module 20 to various vibrations and/or other disturbances that may cause the insulative component 70 to become misaligned with the vent flap 64. Accordingly, the protrusions 132 may provide a barrier to movement of the insulative component 70 in the direction 120, such that the protrusions 132 may prevent the insulative component 70 from enabling the first and second conductive springs 66, 68 to contact the casing 58 inadvertently (e.g., due to a bump in the road or other vibration). It should be noted that the force applied by the vent flap 64 to the insulative component 70 may be sufficient to move the insulative component in the direction 120 past the protrusions 132. The protrusions 132 may therefore be configured to prevent the insulative component 70 from moving in the direction 120 unless a sufficient force is applied by the vent flap 64.

Additionally, FIG. 7 illustrates the insulative component 70 having an opening 134. In certain embodiments, the opening 134 may enable gas to flow from the casing 58 into the housing of the battery module 20 when the vent flap 64 is open. It should be noted that in other embodiments, the insulative component 70 may not include the opening 134. For example, when the insulative component 70 moves in the direction 120, a gap may be formed between the vent flap 64 and the insulative component 70. In such embodiments, the gap may be sufficient to enable gas to flow out of the casing 58, around the insulative component 70, and into the housing of the battery module 20.

Figure 8:
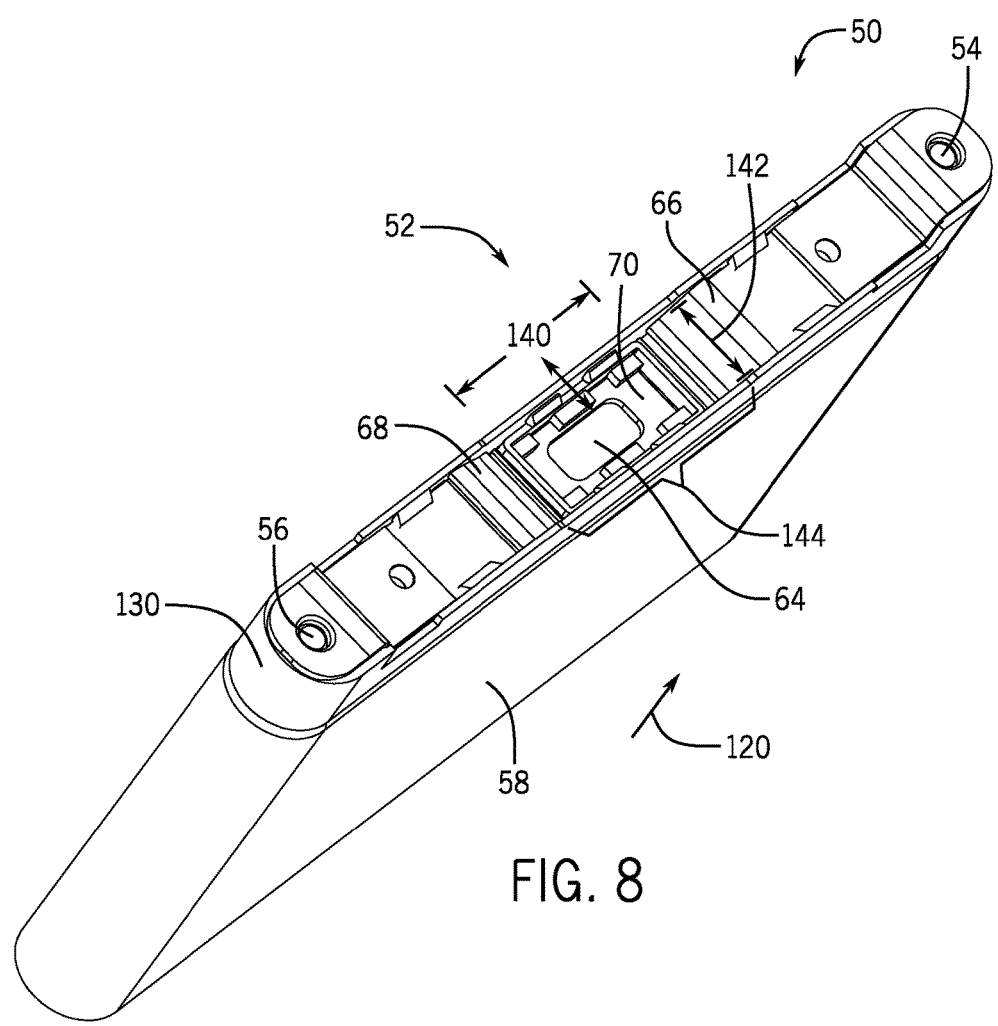
FIG. 8 illustrates another embodiment of an insulative component of the overcharge protection assembly of FIGS. 6 and 7, in accordance with an aspect of the present disclosure.

FIG. 8 illustrates another embodiment of the insulative component 70 of FIGS. 6 and 7. In the illustrated embodiment of FIG. 8, the insulative component 70 may include a length 140 and a width 142. The length 140 and the width 142 of the insulative component 70 may be configured to ensure that the insulative component 70 will move in the direction 120 when the vent flap 64 opens. In certain embodiments, a smaller (e.g., shorter length 140 and/or width 142) insulative component may facilitate movement of the insulative component 70 in the direction 120 when compared to a larger (e.g., longer length 140 and/or width 142) insulative component subjected to the same force. Therefore, in certain embodiments, shortening the width 142 of the insulative component 70 may be desirable.

As shown in the illustrated embodiment of FIG. 8, the separate carrier 130 coupled to the battery cell 50 may include a narrow portion 144. The narrow portion 144 may be adjacent to the vent flap 64 such that the narrow portion 144 of the separate carrier 130 houses just the insulative component 70. The narrow portion 144 may be desirable when the insulative component 70 may include a shorter width 142. For example, the narrow portion 144 may enable the smaller insulative component 70 to be secured by the separate carrier 130, while other components of the battery cell 50 may remain a standard size (e.g., other battery cell components are not modified). Accordingly, the embodiment of FIG. 8 may enable the insulative component 70 to move in the direction 120 when a smaller force is applied to the insulative component 70 by the vent flap 64.

Figure 9:
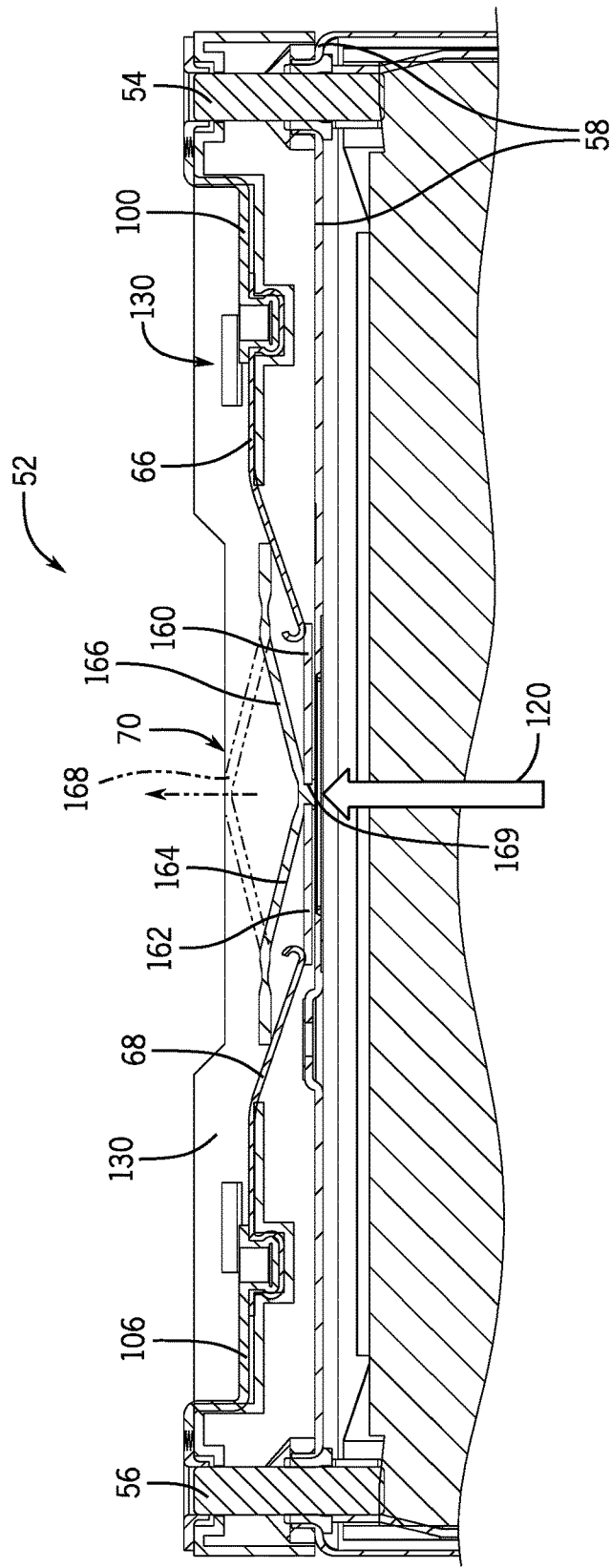
FIG. 9 illustrates another embodiment of the insulative component of the overcharge protection assembly of FIGS. 6-8, in accordance with an aspect of the present disclosure.

FIG. 9 illustrates another embodiment of the insulative component 70 of the overcharge protection assembly 52 of FIGS. 6-8. The illustrated embodiment of FIG. 9 shows that the insulative component 70 includes a first insulative member 160, a second insulative member 162, and an insulative bistable beam 164. In certain embodiments, the insulative bistable beam 164 may be incorporated into the separate carrier 130 of the battery cell 50. In other embodiments, the insulative bistable beam 164 may be a separate component of the separate carrier 130.

As used herein, the insulative bistable beam 164 may be a component that includes a first position 166 and a second position 168. To transition from the first position 166 to the second position 168 a force may be exerted upon the insulative bistable beam 164, which then causes the transition. For example, during normal operation of the battery cell 50 (e.g., when the pressure in the casing 58 is below the threshold value), the insulative bistable beam 164 may be in the first position 166. The insulative bistable beam 164 may be configured to remain in the first position 166 until a force from the vent flap 64 acts upon the insulative bistable beam 164, thereby driving the insulative bistable beam 164 to the second position 168. Accordingly, the insulative bistable beam 164 may be configured to withstand outside forces acting upon the battery module 20 caused by movement of the xEV, for example. In certain embodiments, once the insulative bistable beam 164 reaches the second position 168, the insulative bistable beam 164 may not be configured to return to the first position 166 (e.g., the transition from the first position 166 to the second position 168 is irreversible).

The first insulative member 160 and the second insulative member 162 may be coupled to the insulative bistable beam 164. In certain embodiments, the insulative bistable beam 164 may include grooves 169 configured to receive the first and second insulative members 160, 162. Further, the first and second insulative members 160, 162 may be secured in the grooves 169 via an adhesive (e.g., glue, epoxy, or tape), via a fastener (e.g., a screw, a bolt, or a rivet), or via a heat seal. In other embodiments, the first and second insulative members 160, 162 may be configured to couple to the insulative bistable beam 164 using any suitable technique.

As shown in the illustrated embodiment of FIG. 9, the first insulative member 160 is disposed between the first conductive spring 66 and the casing 58 when the insulative bistable beam 164 is in the first position 166. Similarly, the second insulative member 162 is disposed between the second conductive spring 68 and the casing 58 when the insulative bistable beam 164 is in the first position 166. When the pressure within the casing 58 reaches the threshold level, the vent flap 64 may open, which may then apply a force to the insulative bistable beam 164 causing the insulative bistable beam 164 to move in the direction 120 from the first position 166 to the second position 168. Accordingly, when the insulative bistable beam 164 moves towards the second position 168, the insulative bistable beam 164 may pull the first and second insulative members 160, 162 out from between the first and second conductive springs 66, 68 and the casing 58. The first and second conductive springs 66, 68 may then contact the casing 58, thereby establishing an electrical connection between the positive terminal 54 and the negative terminal 56. Establishing such an electrical connection may trigger an external short circuit, which may discharge the battery cell 50 and prevent thermal runaway during an overcharge test.

In still further embodiments, the insulative component 70 may include the insulative bistable beam 164 and a single insulative member. Accordingly, the single insulative member may be coupled to the insulative bistable beam 164. When the insulative bistable beam 164 is in the first position 166, the single insulative member may be disposed between the first conductive spring 66 and the casing 58 and between the second conductive spring 68 and the casing 58. Conversely, when the insulative bistable beam 164 moves to the second position 168, the single insulative member may be pulled by the bistable beam 164 from between the first conductive spring 66 and the casing 58 and from between the second conductive spring 68 and the casing 58. In such embodiments that include the single insulative member, the groove 169 may serve as a hinge joint to secure the single insulative member to the insulative bistable beam 164 and to facilitate the insulative bistable beam's 164 transition between positions 166 and 168.

Figure 10:
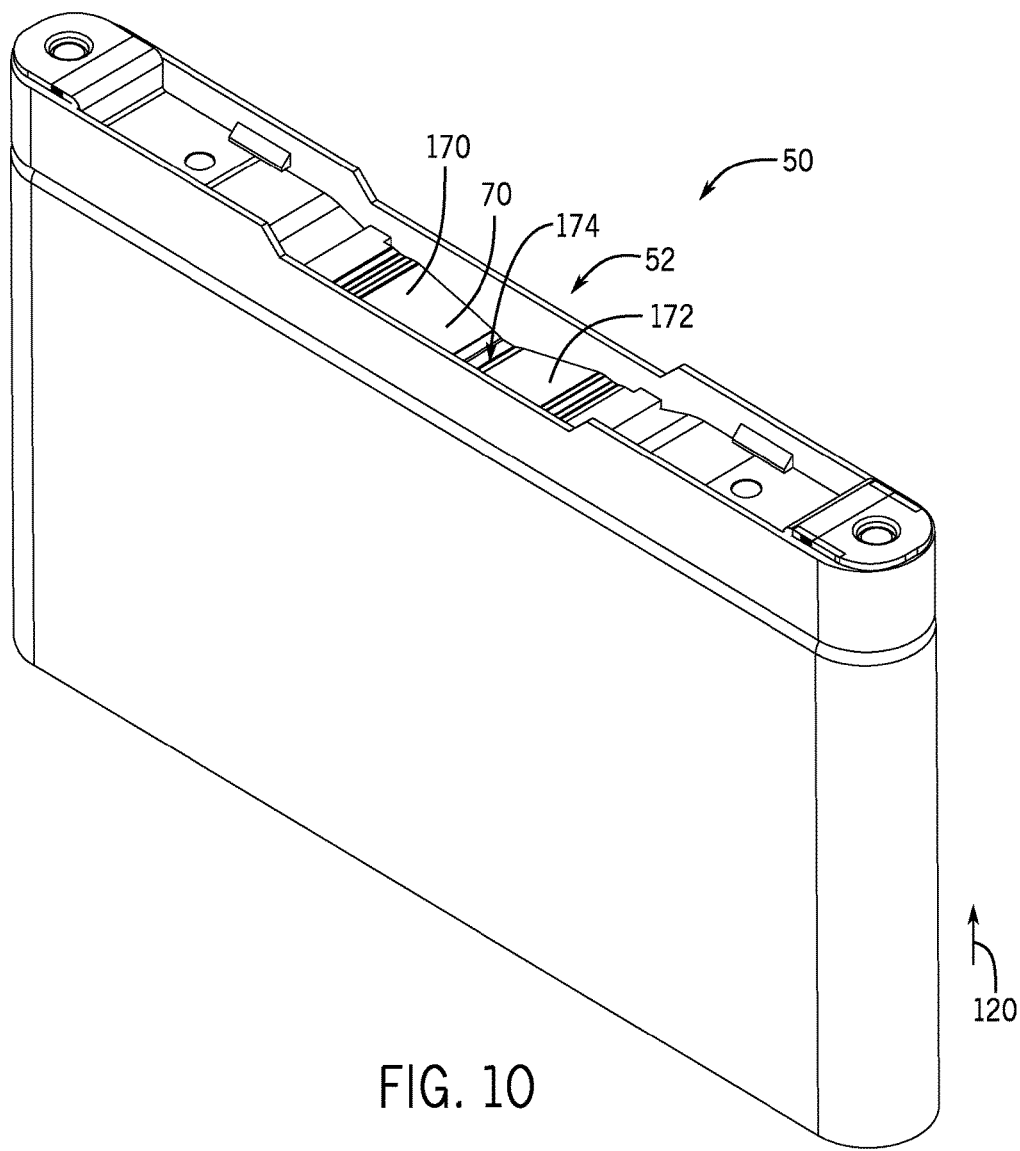
FIG. 10 illustrates a perspective view of the insulative component of FIG. 9 in a first position, in accordance with an aspect of the present disclosure.

FIG. 10 illustrates a perspective view of the insulative component 70 of FIG. 9 in the first position 166. For example, the insulative bistable beam 164 may include a first arm 170, a second arm 172, and an elbow 174, where the elbow 174 connects the first arm 170 and the second arm 172 to one another. As the insulative bistable beam 164 moves from the first position 166 to the second position 168, the elbow moves in the direction 120. In certain embodiments, the elbow 174 may be at a lowest position with respect to the arms 170, 172 when the insulative bistable beam 164 is in the first position 166, and the elbow 174 may be at a highest position with respect to the arms 170, 172 when the insulative bistable beam 164 is in the second position 168. As illustrated in the embodiment of FIG. 10, the elbow 174 is at the lowest point with respect to the arms 170, 172, and thus, is in the first position 166. When the pressure in the casing 58 reaches the threshold level, the vent flap 64 may open and drive the insulative bistable beam 164 to the second position 168. Accordingly, the elbow 174 may transition to the highest position with respect to the arms 170, 172 upon reaching the second position 168.

Figure 11:
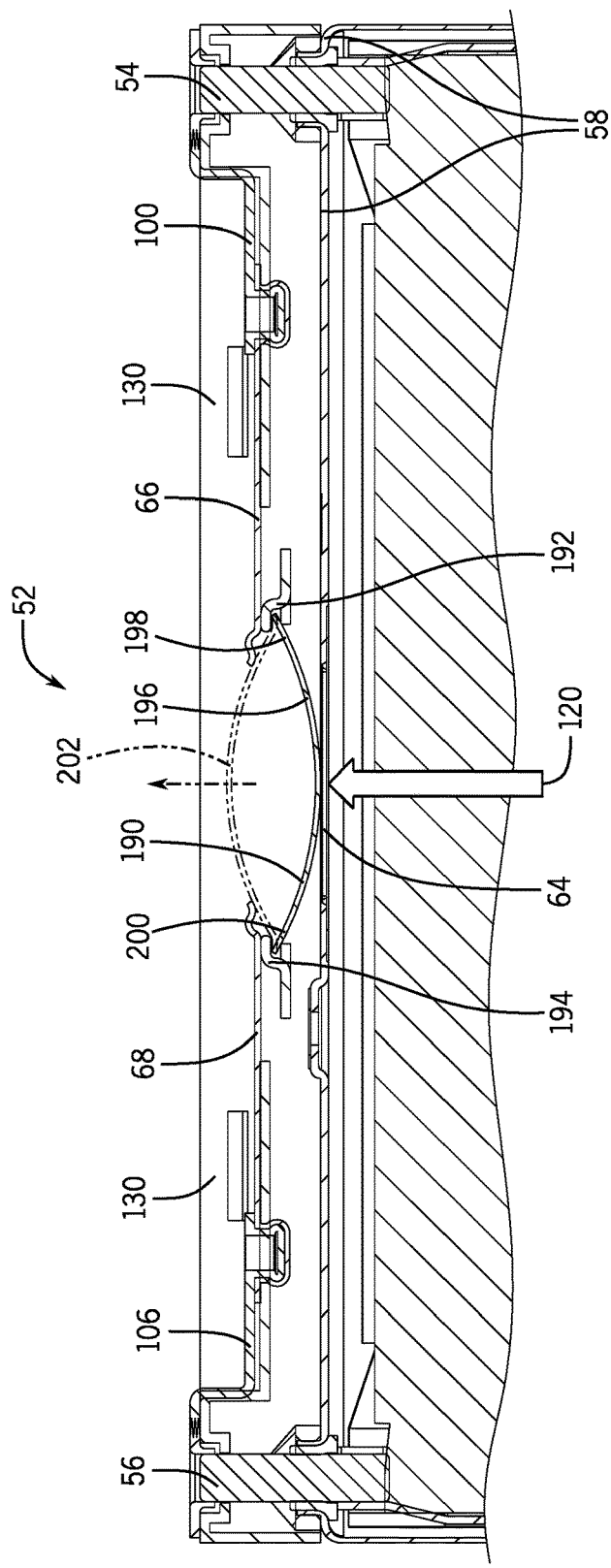
FIG. 11 illustrates another embodiment of an overcharge protection assembly that may be utilized in a battery cell having a casing with an insulative material, in accordance with an aspect of the present disclosure.

FIG. 11 illustrates another embodiment of the overcharge protection assembly 52 that may utilize a casing 58 having an insulative material (e.g., a material that prevents electrical current from readily flowing through it). In regards to the discussion related to FIGS. 3-10, the casing 58 included an electrically conductive material to establish the electric pathway between the positive terminal 54 and the negative terminal 56 when the conductive springs 66, 68 contacted the casing 58. However, in the illustrated embodiment of FIG. 11, the casing 58 may include an electrically insulative material and the overcharge protection assembly 52 may still create an external short circuit to prevent thermal runaway during an overcharge test.

For example, the overcharge protection assembly 52 of FIG. 11 may include a conductive bistable arc 190. Additionally, the separate carrier 130 (e.g., the separate carrier 130 including insulative material) may include a first notch 192 and a second notch 194 configured to retain the conductive bistable arc 190 in a first position 196 when the pressure in the casing 58 is below the threshold value. For example, a first end 198 of the conductive bistable arc 190 may be disposed in the first notch 192 and a second end 200 of the conductive bistable arc 190 may be disposed in the second notch 194. In certain embodiments, the first notch 192 may also provide support for the first conductive spring 66 (e.g., secure the first conductive spring 66 such that it remains substantially stationary with respect to the separate carrier 130). Similarly, the second notch 194 may provide support for the second conductive spring 68 (e.g., secure the second conductive spring 68 such that it remains substantially stationary with respect to the separate carrier 130).

It should be noted that the separate carrier 130, as well as the first notch 192 and the second notch 194 may include an insulative material. Therefore, an electrical connection is absent between the conductive bistable arc 190 and the first and second conductive springs 66, 68 when the pressure in the casing 58 is below the threshold value.

In certain embodiments, the conductive bistable arc 190 may be configured to contact the vent flap 64 when the conductive bistable arc 190 is in the first position 196. In other embodiments, a gap may be formed between the conductive bistable arc 190 and the vent flap 64 when the conductive bistable arc 190 is in the first position 196. In any event, the vent flap 64 may be configured to apply a force to the conductive bistable arc 190 when the vent flap 64 opens (e.g., as a result of the pressure in the casing 58 reaching or exceeding the threshold value) and drive the conductive bistable arc 190 to a second position 202.

As shown in the illustrated embodiment of FIG. 11, the first and second conductive springs 66, 68 may be substantially straight (e.g., parallel to the casing 58). Therefore, the first and second conductive springs 66, 68 may not be biased towards a surface of the casing 58 in the illustrated embodiment of FIG. 11. Rather, the first and second conductive springs 66, 68 may be positioned in such a manner as to enable the conductive bistable arc 190 to contact both the first conductive spring 66 and the second conductive spring 68 when the conductive bistable arc 190 is in the second position 202. Accordingly, when the conductive bistable arc 190 is in the second position 202, the conductive bistable arc 190 forms the electrical connection between the first conductive spring 66 and the second conductive spring 68 (e.g., as opposed to the casing 58 in the embodiments illustrated in FIGS. 3-10). Therefore, when the conductive bistable arc 190 is in the second position 202, an electrical connection is established between the positive terminal 54 and the negative terminal 56 via the first and second conductive springs 66, 68 as well as the conductive bistable arc 190.

In the embodiment illustrated in FIG. 11, the casing 58 is not utilized to establish the electrical connection between the positive terminal 54 and the negative terminal 56. Therefore, the casing 58 may include an insulative material, while the external short circuit is still formed (e.g., via the conductive bistable arc 190) to prevent thermal runaway during an overcharge test. Moreover, an electrical connection between the positive terminal 54 and/or the negative terminal 56 and an external load is not disrupted. Accordingly, the battery cell 50 may avoid thermal runaway while also maintaining a current capacity level (e.g., the current capacity may not decrease).

Figure 12:
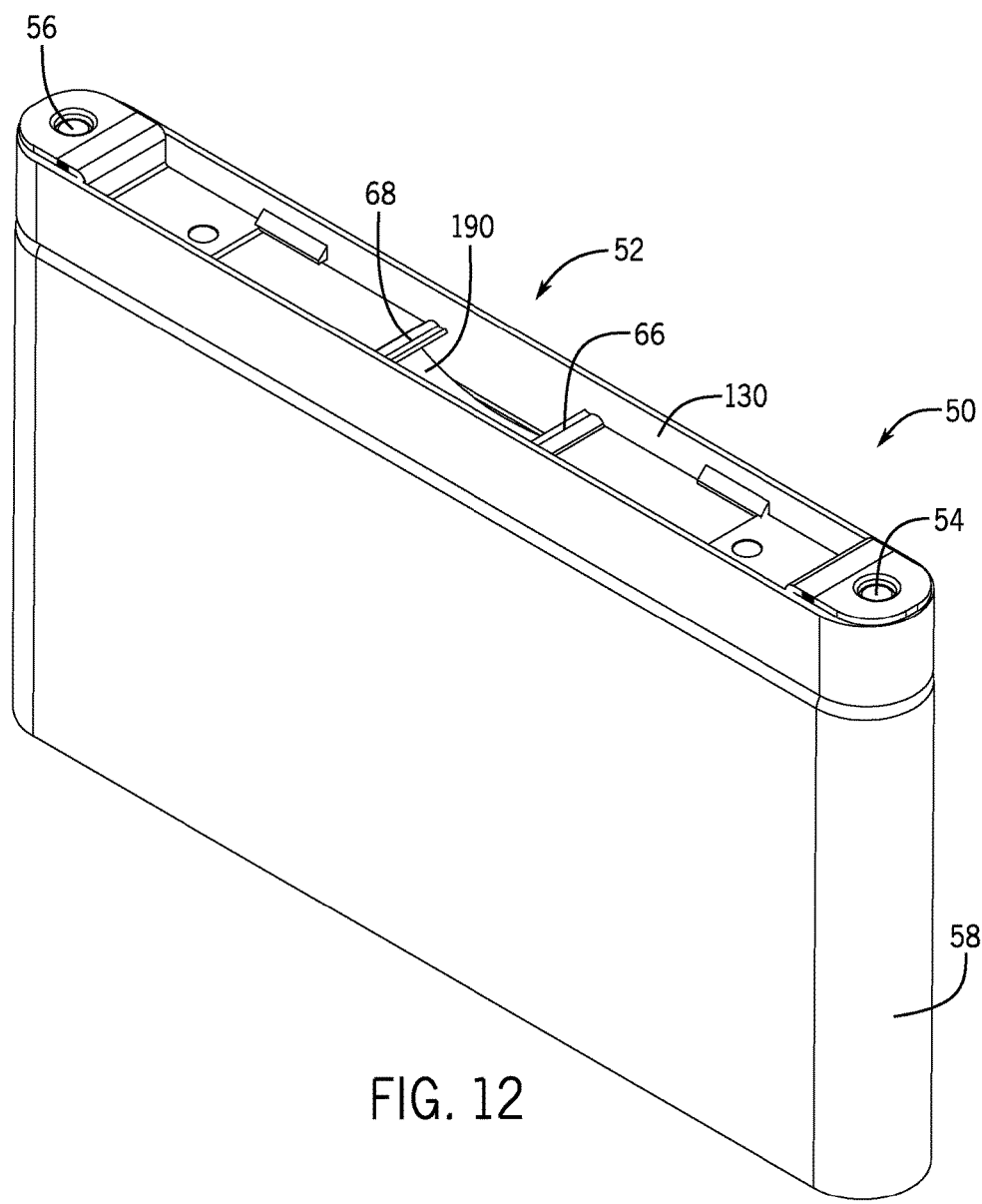
FIG. 12 illustrates a perspective view of the overcharge protection assembly of FIG. 11, in accordance with an aspect of the present disclosure.

FIG. 12 illustrates a perspective view of the overcharge protection assembly 52 of FIG. 11. As shown in FIG. 12, the conductive bistable arc 190 is in the first position 196 because the conductive bistable arc 190 is concave with respect to the casing 58. Conversely, when the conductive bistable arc 190 is in the second position 202, the conductive bistable arc 190 may be convex with respect to the casing 58.

Figure 13:
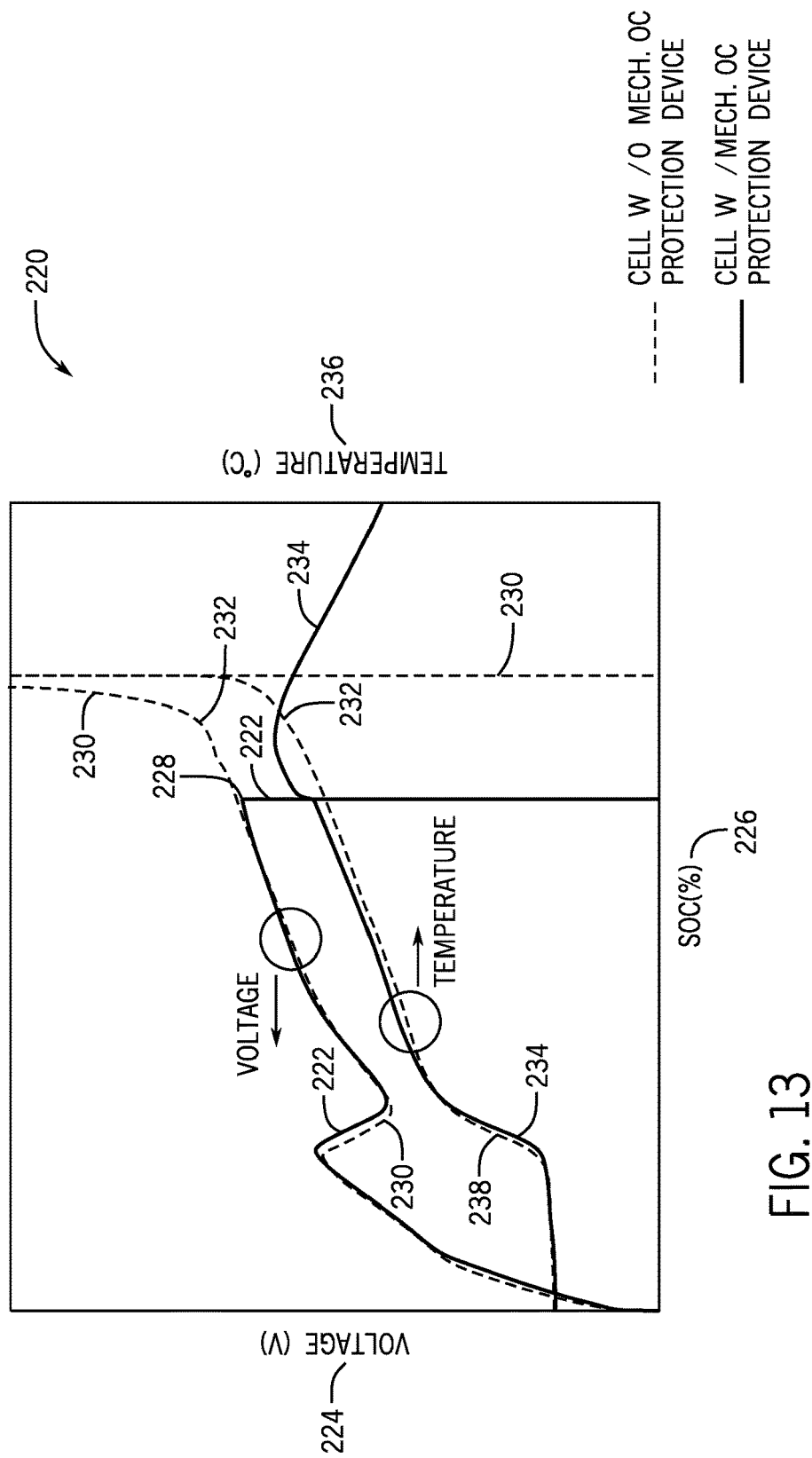
FIG. 13 illustrates a graphical representation of data from an overcharge test performed on a battery cell utilizing an overcharge protection assembly, in accordance with an aspect of the present disclosure.

FIG. 13 illustrates a graphical representation 220 of data from an overcharge test performed on a battery cell utilizing the overcharge protection assembly 52 of the present disclosure. The graph 220 shows an example of an effect of the overcharge protection assembly 52 on a battery cell during an overcharge test. The graph 220 includes a first curve 222 representing voltage 224 as a function of state of charge (SOC) 226 for a battery cell that includes the overcharge protection assembly 52. The first curve 222 shows how voltage 224 generally increases as SOC 226 increases for the battery cell including the overcharge protection assembly 52. However, as SOC 226 continues to increase, the pressure in the casing 58 of the battery cell also increases. As shown in the illustrated embodiment of FIG. 13, when the pressure reaches the threshold value, the overcharge protection assembly 52 triggers an external short circuit by creating an electrical connection between the positive terminal 54 and the negative terminal 56 (e.g., via the casing 58 or the conductive bistable arc 190). Therefore, at point 228, the short circuit occurs and the voltage 224 of the battery cell decreases significantly. Accordingly, the battery cell 50 discharges, thereby preventing thermal runaway.

Conversely, a second curve 230 shows an effect on a battery cell that does not include the overcharge protection assembly 52 of the present disclosure. Accordingly, the voltage 224 continues to increase beyond the point 228 as the SOC 226 increases. Eventually, thermal runaway occurs. Additionally, graph 220 illustrates a third curve 234 representing a temperature 236 as a function of SOC 226 for a battery cell that includes the overcharge protection assembly 52. As shown, the temperature 236 also increases as SOC 226 increases. Additionally, at the point 228 (e.g., when the external short circuit is triggered), the temperature 236 continues to increase. However, the temperature 236 does incur a significant spike. Rather, the temperature 236 increases to a maximum point, but eventually decreases. Accordingly, thermal runaway does not occur.

Conversely, a fourth curve 238 illustrates the temperature 236 of a battery cell that does not include the overcharge protection assembly 52. As shown, the temperature 236 incurs a large increase where the voltage 224 spikes as a result of thermal runaway. Accordingly, the excessive temperature experienced by the battery cell may create permanent damage to the battery cell. Therefore, it is now recognized that the overcharge protection assembly 52 of the present disclosure may prevent thermal runaway and may prevent permanent damage to the battery cell.

One or more of the disclosed embodiments, alone or in combination, may provide one or more technical effects useful in the manufacture of battery modules, and portions of battery modules. The disclosed embodiments relate to battery cells that include an overcharge protection assembly. The overcharge protection assembly may include a vent that opens (e.g., transitions from a first position to a second position) when a pressure in a casing of the battery cell reaches a threshold value. Accordingly, the opening of the vent may enable electrical contact between a positive terminal and the battery cell casing as well as a negative terminal and the battery cell casing. Accordingly, an external short circuit may be triggered by electrically coupling the positive terminal and the negative terminal of the battery cell via the casing. Such an external short circuit may discharge the battery cell, but the external short circuit may prevent thermal runaway and/or permanent damage to the battery cell. Moreover, such an external short circuit may be triggered without disrupting electrical current from an external load to the positive and/or negative terminals. Therefore, a current capacity of the battery cell may be maintained (e.g., not decrease). It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a plurality of battery cells disposed in a housing of the battery module, wherein each of the plurality of battery cells comprises a positive terminal, a negative terminal, an overcharge protection assembly, and a casing;
wherein the overcharge protection assembly comprises a vent flap, a first conductive component, a second conductive component, and a conductive bistable arc, the first conductive component is electrically coupled to the positive terminal, the second conductive component is electrically coupled to the negative terminal, and the vent flap is configured to transition from a closed position to an open position to drive the conductive bistable arc into contact with both the first and second conductive components when a pressure in the casing exceeds a threshold value.

2. The battery module of claim 1, wherein the casing comprises an electrically insulative material.

3. The battery module of claim 1, wherein the conductive bistable arc comprises a first position and a second position, the conductive bistable arc is in the first position when the pressure in the casing is at or below the threshold value, and the conductive bistable arc is driven to the second position by the vent flap when the pressure in the casing exceeds the threshold value.

4. The battery module of claim 3, wherein the conductive bistable arc is secured in the first position by a first notch and a second notch, and wherein the first notch and the second notch each comprise an insulative material.

5. The battery module of claim 4, wherein the first and second notches are configured to support the first conductive component and the second conductive component, and the first and second notches are configured to prevent electrical contact between the conductive bistable arc and the first and second conductive components when the conductive bistable arc is in the first position.

6. The battery module of claim 3, wherein the conductive bistable arc is concave with respect to the casing when the conductive bistable arc is in the first position, and wherein the conductive bistable arc is convex with respect to the casing when the conductive bistable arc is in the second position.

7. The battery module of claim 1, wherein the conductive bistable arc is configured to contact the vent flap when the conductive bistable arc is in the first position.

8. The battery module of claim 1, wherein the conductive bistable arc comprises aluminum.

9. The battery module of claim 1, wherein the first conductive component and the second conductive component are substantially parallel to the casing.

10. A battery module, comprising:
a housing;
a battery cell disposed in the housing of the battery module, wherein the battery cell comprises a positive terminal, a negative terminal, an overcharge protection assembly, and a casing, wherein the casing comprises an electrically insulative material;
wherein the overcharge protection assembly comprises a vent flap, a first conductive spring component, a second conductive spring component, and a conductive bistable arc, the first conductive spring component is electrically coupled to the positive terminal, the second conductive spring component is electrically coupled to the negative terminal, and the vent flap is configured to transition from a closed position to an open position to drive the conductive bistable arc into contact with both the first and second conductive spring components when a pressure in the casing exceeds a threshold value.

11. The battery module of claim 10, wherein the vent flap comprises an indented seam in a center of the vent flap, and wherein the indented seam is configured to break when a pressure in the casing reaches a threshold value.

12. The battery module of claim 10, wherein the vent flap comprises an indented portion on a perimeter of the vent flap, and wherein the indented portion is configured to break when a pressure in the casing reaches a threshold value.

13. The battery module of claim 10, wherein at least one of the first conductive spring component and the second conductive spring component are integrated into a bus bar configured to couple the battery cell to an additional battery cell of the battery module.

14. The battery module of claim 10, wherein the conductive bistable arc comprises a first position and a second position, the conductive bistable arc is in the first position when the pressure in the casing is at or below the threshold value, and the conductive bistable arc is driven to the second position by the vent when the pressure in the casing exceeds the threshold value.

15. The battery module of claim 10, wherein the conductive bistable arc comprises aluminum.

16. A lithium ion battery cell, comprising:
a positive terminal;
a negative terminal;
a casing comprising an electrically insulative material; and
an overcharge protection assembly comprising a vent flap, a first conductive component, a second conductive component, and a conductive bistable arc;
wherein the first conductive component is electrically coupled to the positive terminal, the second conductive component is electrically coupled to the negative terminal, and the vent flap is configured to transition from a closed position to an open position to drive the conductive bistable arc into contact with both the first and second conductive spring components when a pressure in the casing exceeds a threshold value.

17. The lithium ion battery cell of claim 16, wherein the conductive bistable arc comprises a first position and a second position, the conductive bistable arc is in the first position when the pressure in the casing is at or below the threshold value, and the conductive bistable arc is driven to the second position by the vent flap when the pressure in the casing exceeds the threshold value.

18. The lithium ion battery cell of claim 17, wherein the conductive bistable arc is concave with respect to the casing when the conductive bistable arc is in the first position, and wherein the conductive bistable arc is convex with respect to the casing when the conductive bistable arc is in the second position.

19. The lithium ion battery cell of claim 16, wherein the conductive bistable arc comprises aluminum.

* * * * *